Figure 1:
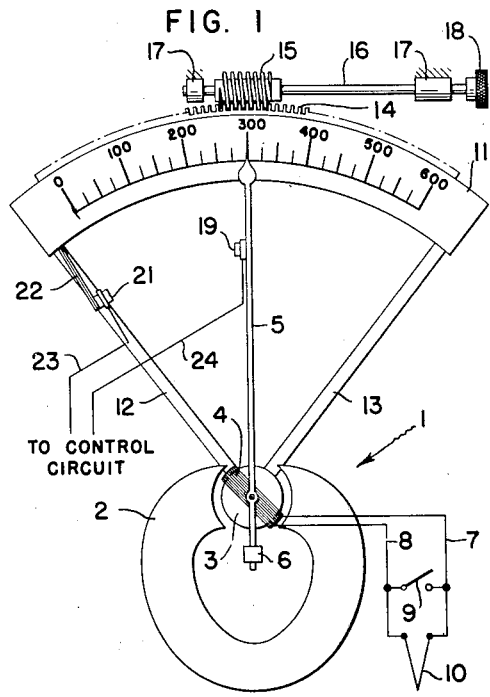

Feb. 22, 1949.                    E. M. SMITH                    2,462,566
                              CONTROL INSTRUMENT
                              Filed Oct. 18, 1946

*INVENTOR.*
EDGAR M. SMITH
BY
ATTORNEY.

Patented Feb. 22, 1949

2,462,566

UNITED STATES PATENT OFFICE 2,462,566

CONTROL INSTRUMENT

Edgar M. Smith, Trenton, N. J., assignor, by mesne assignments, to Minneapolis-Honeywell Regulator Company, Minneapolis, Minn., a corporation of Delaware Application October 18, 1946, Serial No. 704,136

5 Claims. (Cl. 200—56)

The present invention relates to control instruments, and more particularly to a so-called blind controller. In many control applications it is not necessary to have an indication or a record of the value of the condition, such as temperature or pressure, which is under control. For applications of this type there is generally used a blind controller or one that serves only to control the condition to a predetermined value without indicating what is the value at any given time. Controllers of this type are both simple and relatively inexpensive.

It is an object of the present invention to make a blind controller that is simple in construction and operation. It is a further object of the invention to provide an inexpensive and efficient controller which may easily be adjusted so that the condition under control will be maintained at any value within the range of the instrument. This is done by bringing the control actuating pointer to a predetermined zero position, and moving a cooperating control element relative thereto to a position corresponding to the desired value of the condition. The pointer is then moved into engagement with the element when the condition reaches that value.

It is a further object of the invention to provide a controller in which the control point may be set accurately and easily without disturbing the moving elements of the system. Because of the type of control point setting that is used the zero position of the galvanometer or other pointer, even though it may shift, is always taken into consideration. It is also an object of the invention to provide a controller in which ambient temperature changes will have no effect on the actual value at which the condition under control is maintained.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 2:
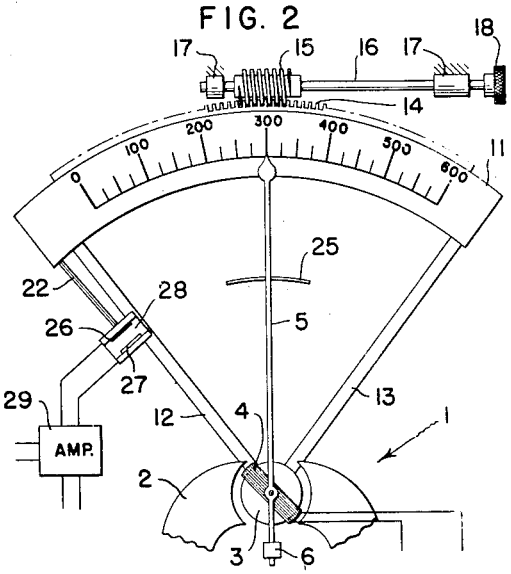
Figure 3:
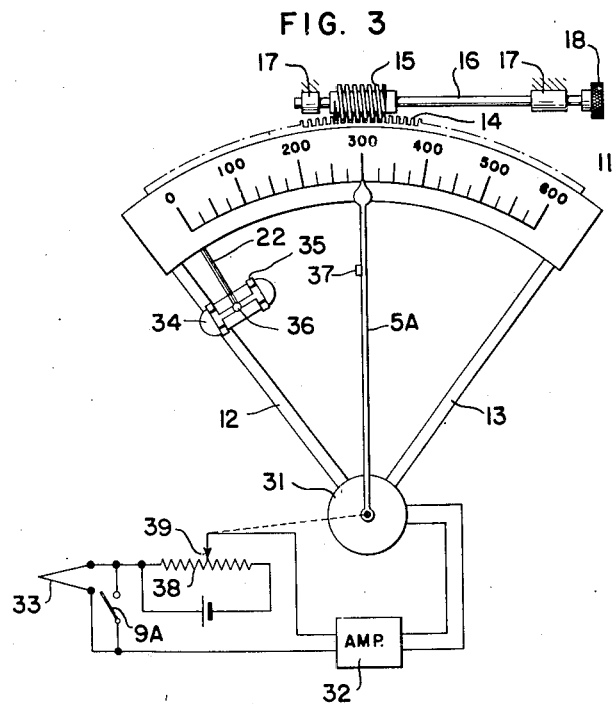

In the drawings:

Figure 1 is a diagrammatic view of one form which the control mechanism can take, and Figures 2 and 3 are views similar to Figure 1 showing different types of control mechanisms.

There is shown diagrammatically a galvanometer 1 having a magnet 2 between the pole pieces of which is placed the conventional core 3. Surrounding this core and rotating in the air space between it and the pole pieces there is a movable coil 4 whose position is changed in response to the voltage impressed on the coil. Attached to and movable with the coil is a pointer 5 that is provided with a suitable counterweight 6. The terminals of the galvanometer are connected by lead wires 7 and 8 with a suitable source of energy such as a thermocouple 10. As the temperature to which the thermocouple is subjected changes the E. M. F. produced by the thermocouple will vary, and when this changing E. M. F. is impressed on the galvanometer the coil and pointer will deflect to a position corresponding to the temperature of the thermocouple. It is noted that a switch 9 is provided across the galvanometer leads so that the coil may be shorted for purposes of control point adjustment, as will be explained below.

As the pointer 5 deflects it moves across a calibrated scale that is printed or otherwise applied to a scale plate 11. This plate is supported by members 12 and 13 which are joined together and mounted for pivotal movement at a point coaxial with the axis around which coil 4 moves. The scale plate may be adjusted to any desired position by means of a worm and sector adjusting mechanism comprising teeth 14 formed on the outer edge of scale plate 11 which mesh with the teeth of worm 15. The worm is supported for rotation on a shaft 16 that is in turn mounted in stationary bearings 17. A knob 18 is provided on the end of shaft 16 whereby this shaft may be rotated.

For purposes of control there is provided a pair of contacts 19 and 21 the former of which is mounted on pointer 5 and the latter of which is mounted on a bi-metallic support 22 which extends from scale plate 11. These contacts are connected by wires 23 and 24 to a suitable control circuit which it is intended will control the application of some heating medium to the location where the thermocouple is placed.

In the operation of the control instrument switch 9 is first closed to short the terminals of the galvanometer so that the galvanometer coil and the pointer carried thereby will assume a zero position. Knob 18 is then rotated until the calibrated scale on plate 11 has the calibration mark under pointer 5 corresponding to the temperature which is to be maintained. For example, in the arrangement shown the device is adjusted to control at 300°. Thereafter switch 9 is opened so that the thermocouple voltage is applied to the galvanometer coil. Increasing temperature will cause the pointer to rotate in a counterclockwise direction until contact 19 that is carried by pointer 5 engages stationary contact 21 to close the control circuit. As the control circuit is closed some mechanism is operated in order to stop the supply of heat to the space under control. As the temperature reduces in response to stopping of the heat supply, pointer 5 will move in a clockwise direction and contacts 19 and 21 will be separated. The control circuit will then be operated to increase the supply of heat.

In view of the fact that plate 11 which carries contact 21 is always moved to some position relative to pointer 5 when the latter is in its zero position it will be seen that the adjusted position of contact 21 and plate 11 will be independent of any changes in zero position of pointer 5 since the latter will always come to some given zero position prior to the time a control point adjustment is made. It is also noted that contact 21 is mounted on a bi-metallic support which will warp to shift the position of the contact in response to ambient temperature changes. Therefore, if the temperature of the location in which the instrument is placed should change from time to time the position of contact 21 relative to plate 11 will be shifted to compensate for these ambient temperature changes. This means that the actual control point of the temperature under control will always remain the same regardless of the temperature to which the instrument is subjected.

It is noted that coil 4 is shown in its zero position in the drawings and that pointer 5 is not mounted at right angles to this coil as is usual in galvanometer construction. This is done merely for convenience in adjusting the control point of the instrument since if the instrument is mounted in a casing that is provided with a window through which the scale and pointer could be seen the convenience and appearance of the casing would be increased by having this window in the center thereof.

In Figure 2 there is shown a controller construction that is similar to that which has been described above. There is shown however, a slightly different form of control mechanism. In this embodiment it is intended that pointer 5 carry a vane 25 of a vane and coil oscillator type control system such as that described in Wannamaker application, Serial No. 694,401 filed August 31, 1946. The coils for this type of control system are shown at 26 and 27 and are mounted on a support 28. This support is also carried by a bi-metallic element 22 so that the position of the coils will vary in accordance with ambient temperature. These coils are connected with suitable wires to an oscillator and amplifying device 29 which in turn is connected with the ultimate control device that may well be an electrically operated valve.

Sometimes it may be desirable to actuate a switch mechanism that requires more power than is obtainable from a galvanometer pointer. When this is the case some means having more power than a galvanometer coil can be used to move the pointer. Such an arrangement is shown in Figure 3 of the drawing wherein pointer 5A, corresponding to pointer 5 of Figures 1 and 2, is positively driven by means of an electric motor 31. In the embodiment of this figure there is shown a potentiometer circuit in which a thermocouple 33 is subjected to the temperature under measurement and control. As the temperature to which the thermocouple is subjected varies a potentiometer circuit is unbalanced to act through an amplifier 32 to energize motor 31 for rotation in one direction or an opposite direction depending upon the direction of potentiometer unbalance. This motor and amplifier in connection with the potentiometer circuit may take the form of that shown in Wills application, Serial No. 421,173, filed December 1, 1941 and which has matured to Patent No. 2,423,540, July 8, 1947. In this case the control mechanism is shown as being a mercury switch 34 that is pivotally mounted on the bi-metallic support 22. The mercury switch is supported by means of a bracket 35 which has an upstanding projection 36. As pointer 5A moves in a counterclockwise direction a downwardly projecting arm 37 will engage the projection 36 and thereby tilt the mercury switch and perform the control operation. This same movement of the pointer 5A is imparted through suitable connections to move a contact 39 along the slidewire 38 of the potentiometer mechanism to thereby rebalance the potentiometer circuit. Thus, as the potentiometer is unbalanced in response to changes in temperature, pointer 5A is positively moved in one direction or the other. If the temperature increases to the control point, member 37 will act to throw the control switch.

In this case also the control point is adjusted by having the pointer 5A turned to a predetermined position which corresponds to the zero position of the device, and then adjusting a scale plate which carries a control switch to some angular position with respect to the pointer. The pointer will then move through this angle as the temperature increases to the control point and the pointer will actuate the switch when this temperature is reached. When the control point of this embodiment of the invention is to be adjusted a switch 9A, corresponding to switch 9 of Figure 1, is closed to short out the thermocouple. The instrument will then be unbalanced to move contact 39 along resistance 38 to some particular position and simultaneously shift pointer 5A to a zero position. Scale plate 11 is then moved to the desired control point position.

From the above description it will be seen that one of the features of my invention is the mounting of one element of control couple on a pointer while the other element thereof is mounted on a support which can be adjusted relative to this pointer to some position depending upon the value at which it is intended to maintain the condition under control. Broadly the invention is directed to the actuation of a control mechanism by a simple measuring instrument. By having suitable calibration marks printed on a scale that can be moved relative to the pointer itself I have done away with the necessity of extra scales and pointers. Since the pointer and scale carry the control elements no means such as a depressing bar is required to move this pointer positively into and out of engagement with contact actuating mechanism. Further, the feature of using the pointer itself when it is in a zero position as the control index simplifies the construction of the controller and it makes one in which the possibility of error due to a shift in zero of the pointer is reduced to a minimum. Fundamentally the instrument is independent of the initial position of the pointer since the movable control member is always shifted a given distance with respect to this pointer whenever the control point of the instrument is changed.

While the invention is described as being used to actuate a control circuit upon the attainment of a predetermined high temperature it will be obvious to those skilled in the art that the parts could be so arranged that the control circuit was closed when some predetermined low temperature was attained.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. In a control instrument, the combination of a pointer movable around an axis from a zero point, means to move said pointer around said axis from said zero point to positions varying with the value of a condition, a control element carried by said pointer, a plate having calibration marks on it corresponding to the value of said condition, means to move said plate around an axis coaxial with that of said pointer from a position corresponding to the zero position of said pointer, said plate having a second control element on it aligned with the minimum calibration mark, said control elements cooperating with each other when the value of said condition is such that said pointer is moved from its zero position to a position which it is aligned with the minimum scale marks of said plate, this value being determined by the adjustment of said plate from said zero position.

2. In a control instrument, the combination of a deflecting member, said member having a normal zero position, means to move said member from said zero position through a path to various other positions depending upon the value of a variable condition, a plate having a scale thereon calibrated in terms of said condition, means to move said plate through a path parallel to that of said member, said member being readable against the calibration on said scale when said member and said scale are both at rest, a first control element carried by said member, a second cooperating control element carried by said plate and located at a point corresponding to the minimum calibration marks of said scale, said control elements cooperating when said member has moved relative to said plate to a position where it is cooperating with the minimum calibration of said scale.

3. In a control instrument, the combination of a pointer element movable through an arc from a zero position to positions corresponding to the value of a variable condition, means responsive to the value of said condition to move said pointer, a scale, means to move said scale relative to the zero position of said pointer to a position corresponding to the desired value of said condition, and cooperating control elements carried by said pointer and said scale to be engaged when said pointer reaches a position corresponding to the desired value of said condition.

4. In a control instrument, the combination of a pointer movable from a zero position to various positions dependent upon the value of a variable condition, a calibrated scale having a zero mark and calibration marks movable through a path parallel to that of said pointer, means to move said scale from a position in which the zero mark thereon is aligned with said pointer in the zero position of the latter to a position in which a calibration mark thereon equal to the value at which the condition is to be maintained is aligned with said pointer when the latter is in its zero position, a first control contact movable with said pointer, a second control contact movable with said scale and located opposite said zero mark, said control elements cooperating to produce a control function when said pointer is aligned with the zero mark of said scale.

5. In a control instrument, a pointer movable from a zero position to various positions dependent upon the value of a variable condition, a first control element carried by said pointer, a second control element, a movable member mounted for movement through a path parallel to the path of movement of said pointer, a temperature responsive means to support said second control element on said member whereby as the ambient temperature varies the position of said second control element relative to said member will be varied, said control elements cooperating to produce a control operation when said first and second control elements are in a given relative position, and means to move said member through its path to various positions relative to the zero position of said pointer.

EDGAR M. SMITH.

REFERENCES CITED

The following references are of record in the file of this patent:

UNITED STATES PATENTS

| Number | Name | Date |
|---|---|---|
| 1,410,120 | Radley | Mar. 21, 1922 |
| 1,412,451 | Collins | Apr. 11, 1922 |
| 1,465,465 | Duffie | Aug. 21, 1923 |
| 1,789,548 | Heap | Jan. 20, 1931 |
| 2,283,525 | Witham | May 19, 1942 |